United States Patent

Sugio et al.

[11] 4,342,680
[45] Aug. 3, 1982

[54] STABILIZED OXYMETHYLENE COPOLYMER COMPOSITION

[75] Inventors: Akitoshi Sugio, Ohmiya; Akira Amemiya; Masaharu Kimura, both of Tokyo; Yoshiharu Otuki, Kawaguchi; Kiyokazu Kawaguchi, Matsudo, all of Japan

[73] Assignee: Mitsubishi Gas Chemical Company, Inc., Japan

[21] Appl. No.: 132,165

[22] Filed: Mar. 20, 1980

[30] Foreign Application Priority Data

Jul. 24, 1979 [JP] Japan .................................. 54-94075

[51] Int. Cl.³ .......................... C08K 3/22; C08K 5/13; C08K 5/34
[52] U.S. Cl. ..................... 524/100; 524/91; 524/593; 524/119
[58] Field of Search ................ 260/45.8 NT, 45.85 B, 260/45.85 R, 45.95 H, 45.7 R, 37 AL; 528/242

[56] References Cited

U.S. PATENT DOCUMENTS

| | | | |
|---|---|---|---|
| 3,017,389 | 1/1962 | Langsdorf, Jr. et al. | 528/232 |
| 3,219,621 | 11/1965 | Prichard | 260/45.8 NT |
| 3,340,219 | 9/1967 | Stemmler | 260/37 AL |
| 3,366,599 | 1/1968 | Heuck et al. | 260/45.95 H |
| 3,450,665 | 6/1969 | Wagner et al. | 260/37 AL |
| 3,484,399 | 12/1969 | Kakos, Jr. | 260/45.85 R |
| 3,484,400 | 12/1969 | Halek | 260/37 AL |
| 3,704,275 | 11/1972 | Burg et al. | 260/37 AL |
| 3,743,614 | 7/1973 | Wolters et al. | 260/45.85 B |
| 4,169,867 | 10/1979 | Burg et al. | 525/417 |
| 4,243,580 | 1/1981 | Gale | 260/45.8 NT |

*Primary Examiner*—John Kight, III
*Assistant Examiner*—R. A. White
*Attorney, Agent, or Firm*—Wenderoth, Lind & Ponack

[57] ABSTRACT

A stabilized oxymethylene copolymer composition comprising an oxymethylene copolymer, and incorporated therein, (1) at least one amine-substituted triazine of the following formula

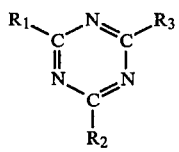

wherein $R_1$, $R_2$ and $R_3$ are a hydrogen atom, a halogen atom, a hydroxyl group, an alkyl group, an alkoxy group, an aryl group, a hydrogenated aryl group, an amino group or a substituted amino group, and at least one of them is an amino group or a substituted amino group, (2) at least one sterically hindered phenol of the following formula

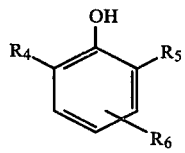

wherein $R_4$ and $R_5$ are an alkyl group, a substituted alkyl group or a substituted triazole group and $R_6$ is an alkyl group, a substituted alkyl group, an alkoxy group or a substituted amino group, and (3) at least one metal-containing compound selected from the group consisting of the hydroxides, inorganic acid salts, carboxylic acid salts and alkoxides of an alkali metal which is sodium or potassium or an alkaline earth metal which is magnesium, calcium or barium.

6 Claims, No Drawings

STABILIZED OXYMETHYLENE COPOLYMER COMPOSITION

BACKGROUND OF THE INVENTION

This invention relates to a stabilized oxymethylene copolymer composition.

Various oxymethylene copolymer compositions are known which are obtained by subjecting an oxymethylene copolymer obtained by copolymerizing formaldehyde or its cyclic oligomer such as trioxane or tetraoxane with a monomer copolymerizable therewith to a terminal group treatment to prevent depolymerization at the terminals of the polymer, and then incorporating various additives such as antioxidants, heat stabilizers, light stabilizers and lubricants. In particular, the incorporation of heat and oxidation stabilizers in combination with the terminal group treatment is essential in maintaining and improving the quality of the oxymethylene copolymer, and various stabilizers and various combinations thereof have heretofore been proposed. For example, Japanese Patent Publication No. 21148/65 discloses combinations of amidine compounds with sterically hindered phenols, specifically combinations of cyanoguanidine, polyaminotriazole or N,N-diarylmelamines with 2,2'-methylene-bis(4-methyl-6-t-butylphenol).

With such binary combinations, however, various defects to be remedied are found especially in heat stabilization properties when the balance of the properties of the oxymethylene copolymer composition is considered. Conventional oxymethylene copolymer compositions have to be molded within a very narrow temperature range, usually 185° to 220° C., and at the highest 225° C. Oxymethylene copolymer compositions as molding materials are frequently used to produce small articles, for example machine parts such as gears and bearings. Thus, depending upon the capacity of a molding machine, the molding material often resides in the cylinder for a longer period of time than the critical time period that induces the decomposition of the molding material. Hence, undersirable phenomena, such as the decomposition or foaming of the material, occur within the cylinder, and result in the formation of poor unacceptable molded articles.

Under the circumstances, it has been strongly desired in the market to provide an oxymethylene copolymer composition as a molding material which exhibits very good heat stability during molding while retaining the inherent balance of the properties of the oxymethylene copolymer composition.

When some molding materials of oxymethylene copolymers which have conventionally been on the market were subjected to a residence test at a material temperature of 235° C. and 250° C., it was found that almost all of these conventional molding materials developed heavy yellowing at a material temperature of 235° C. showing a marked deterioration of the molding materials, and numerous silver streaks formed on the surface of the molded articles, and that at a material temperature of 250° C., the molding material was foamed owing to its vigorous decomposition within the cylinder, and therefore, the material did not fully flow in the mold and its injection molding was virtually impossible. The residence test is a test whereby the molding material is maintained at a temperature of 235° C. or 250° C. for 60 minutes and then injection-molded, and the appearance and other properties of the resulting molded article are evaluated. This testing method can be assessed as a heat stability test during molding which shows results well corresponding in practice to those obtained by a long-term test for continuous moldability at a molding temperature of 185° C. to 225° C., and a test for deterioration in a hot air environment at service temperatures. When the aforesaid molding material was subjected to a continuous injection-molding test (continuous molding for 1 hour) at the above molding material temperature, silver streaks, flashes, flow marks, etc. formed on the surface of the resulting molded article to aggravate its appearance, and moreover, a large amount of mold deposit was seen to further reduce the appearance of the molded article.

SUMMARY OF THE INVENTION

The present inventors made extensive investigations in order to provide an oxymethylene copolymer composition having very high heat stability with a view to remedying the defects of conventional oxymethylene copolymer compositions as molding materials. These investigations have led to the discovery that the intended objective can be achieved by adding the following three-component stabilizer system.

Thus, the present invention provides a stabilized oxymethylene copolymer composition comprising an oxymethylene copolymer, and incorporated therein, (1) at least one amine-substituted triazine of the following formula

(A)

wherein $R_1$, $R_2$ and $R_3$ represent a hydrogen atom, a halogen atom, a hydroxyl group, an alkyl group, an alkoxy group, an aryl group, a hydrogenated aryl group, an amino group or a substituted amino group, and at least one of them is an amino group or a substituted amino group, (2) at least one sterically hindered phenol of the following formula

(B)

wherein $R_4$ and $R_5$ represent an alkyl group, a substituted alkyl group or a substituted triazole group and $R_6$ represents an alkyl group, a substituted alkyl group, an alkoxy group or a substituted amino group, and (3) at least one metal-containing compound (C) selected from the group consisting of the hydroxides, inorganic acid salts, carboxylic acid salts and alkoxides of an alkali metal which is sodium or potassium or an alkaline earth metal which is magnesium, calcium or barium.

DETAILED DESCRIPTION OF THE INVENTION

The oxymethylene copolymer composition of this invention including the aforesaid ternary stabilizer system can be molded favorably even after it has been maintained for 60 minutes at a material temperature of 250° C., and can give molded articles which are substantially comparable in surface characteristics such as color and gloss to initial-stage molded articles obtained at a material temperature of 250° C. with a cycle time of 1 minute. This fact means that the oxymethylene copolymer composition of this invention can have a temperature of 250° C. or more as the critical range of molding temperature. This temperature range is far above the upper limit of 220° C. or 225° C. which is normally applied to conventional molding materials of oxymethylene copolymer compositions. Accordingly, the present invention can provide molding materials of oxymethylene copolymers which have surprisingly high heat stability.

In addition, in the continuous molding of the oxymethylene copolymer composition of this invention at a material temperature of 220° C. and 230° C., the percentage of products having unacceptable appearance is markedly reduced to ⅓ to ¼ of that of conventional products. Moreover, the problem of mold deposit which has been most troublesome in the prior art is not observed at all with the oxymethylene copolymer composition of this invention. These facts also show that the present invention can provide a molding material having superior heat stability.

The tensile strength, flexural strength, tensile impact strength, Izod impact strength, heat distortion temperature, dielectric constant, etc. of the molded articles obtained from the oxymethylene copolymer composition of this invention are comparable to or better than those of conventional oxymethylene copolymer compositions. In a long-term hot air environment test in a hot air environment at 120° C., the conventional molded products are virtually deteriorated after a lapse of 500 hours, whereas no deteriorating tendency is substantially noted even after a lapse of 500 hours in the molded articles obtained from the composition of this invention.

As is evident from the foregoing description, the oxymethylene copolymer composition of this invention provides a molding material of very high performance which is quite free from the defects of conventional compositions of similar kind. Such properties have been brought about for the first time by the synergistic action of the ternary stabilizer system.

The three stabilizers used in this invention are the amine-substituted triazine of general formula (A) (to be referred to as "stabilizer A"), the sterically hindered phenols of general formula (B) (to be referred to as "stabilizer B"), and the metal-containing compound (C) (to be referred to as "stabilizer C").

Examples of the stabilizer A include guanamine (2,4-diamino-sym-triazin), melamine (2,4,6-triamino-sym-triazine), N-butylmelamine, N-phenylmelamine, N,N-diphenylmelamine, N,N-diallylmelamine, N,N',N''-triphenylmelamine, N,N',N''-trimethylolmelamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, and N,N,N',N'-tetracyanoethylbenzoguanamine. Of these, melamine, guanamine, benzoguanamine, and 2,4-diamino-6-methyl-sym-triazine are especially suitable.

Compounds known as antioxidants can be used as the stabilizer B. Specific examples of the stabilizer B are 2,2'-methylenebis(4-methyl-6-t-butylphenol), 1,6-hexanediol-bis[3-(3,5-di-t-butyl-4-hydroxyphenyl)propionate], pentaerythrityl-tetrakis[3-(3,5-di-t-butyl-4-hydroxyphenyl)propionate, distearyl-3,5-di-t-butyl-4-hydroxybenzyl phosphonate, 2,6,7-trioxa-1-phosphabicyclo[2.2.2]-oct-4-yl-methyl-3,5-di-t-butyl-4-hydroxyhydrocinnamate, 3,5-di-t-butyl-4-hydroxyphenyl-3,5-distearyl-thiotriazylamine, 2(2'-hydroxy-3',5'-di-t-butylphenyl)-5-chlorobenzotriazole, 2,6-di-t-butyl-4-hydroxymethylphenol, 1,3,5-trimethyl-2,4,6-tris(3,5-di-t-butyl-4-hydroxybenzyl)benzene, 4,4'-methylene-bis(2,6-di-t-butylphenol), 3,5-di-t-butyl-4-hydroxybenzyl-dimethylamine and N,N'-hexamethylenebis(3,5-di-t-butyl-4-hydroxyhydrocinnamide. Among them, 2,2'-methylenebis(4-methyl-6-t-butylphenol), 1,6-hexanediol-bis[3-(3,5-di-t-butyl-4-hydroxyphenyl)propionate] and pentaerythrityl-tetrakis[3-(3,5-di-t-butyl-4-hydroxyphenyl)propionate] are especially effective and preferred.

As the stabilizer C, the inorganic salts include carbonates, phosphates, silicates, borates, etc.; the carboxylic acid salts include salts of monocarboxylic acids such as acetic acid or butyric acid, and salts of polycarboxylic acids such as oxalic acid, malonic acid, succinic acid and adipic acid; and the alkoxides includes methoxides and ethoxides. Of these metal-containing compounds, calcium hydroxide, magnesium hydroxide, potassium hydroxide and magnesium carbonate are especially effective and preferred.

Each of the stabilizers A, B and C may be one or a mixture of two or more of the compounds specified. The amount of each of these stabilizers differs depending upon its type. Usually, per 100 parts by weight of the oxymethylene copolymer, the amount of the stabilizer A is 0.01 to 7 parts by weight, preferably 0.01 to 5 parts by weight; the amount of the stabilizer B is 0.05 to 5 parts by weight, preferably 0.05 to 3 parts by weight, and the amount of the stabilizer C is 0.004 to 5 parts by weight, preferably 0.005 to 5 parts by weight. If the amounts of the stabilizers fall outside these specified ranges, the surface characteristics of the molded products in a heat stability test during molding by an injection molding machine are deteriorated (for example, the color is bad, a and silver streaks occur), and/or the number of unacceptable molded articles increases in a continuous molding test in an injection molding machine. The order of addition of these stabilizers is not critical, and the form of the stabilizers at the time of addition may be a powder, solution, emulsion or suspension.

The oxymethylene copolymer in this invention denotes a copolymer containing 0.4 to 40 mole%, preferably 0.4 to 10 mole%, of an oxyalkylene unit in the oxymethylene main chain. Such a copolymer can be obtained by the action of a cyclic ether or acetal on formaldehyde and/or its cyclic oligomer such as trioxane or tetroxane in the presence of a polymerization catalyst. General cationic polymerization catalysts can be used as the polymerization catalyst. Compounds containing boron fluoride are especially suitable, and hydrated compounds and coordinated complexes can be used.

Boron trifluoride-diethyl etherate, which is a coordination complex with an ether, is an especially preferred catalyst. The cyclic ether or acetal used as a comonomer is a compound represented by the following formula.

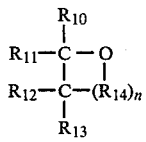

wherein $R_{10}$, $R_{11}$, $R_{12}$ and $R_{13}$ are identical or different, and represent a hydrogen atom, an alkyl group, or an alkyl group substituted by halogen, and $R_{14}$ represents a methylene or oxymethylene group or a methylene or oxymethylene group substituted by an alkyl group or haloalkyl group (in which case n is an integer of 0 to 3), or a divalent group of the formula

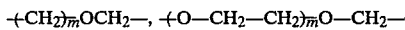

in which case n is equal to 1, and m is an integer of 1 to 4.

In the above formula, the alkyl group contains 1 to 5 carbon atoms, and its hydrogen atoms may be substituted by up to 3 halogen atoms, especially chlorine atoms. Specific examples of the cyclic acetal or ether are ethylene oxide, glycol formal and diglycol formal. Propylene oxide and epichlorohydrin can also be used. Cyclic formals of long-chain α,ω-diols, such as butanediol formal (i.e., 1,3-dioxepane) and hexanediol formal, are also suitable.

The oxymethylene copolymer obtained by polymerization may be subjected to a treatment of removing catalyst in a known manner. Or after the polymerization, a trivalent organic phosphorus compound of the formula

 (D)

wherein $R_7$, $R_8$ and $R_9$ are identical or different, and each represents an alkyl group, a cycloalkyl group, a haloalkyl group, an aryl group, a substituted aryl group, an aralkyl group, an alkoxy group a substituted alkoxy group, a mercapto group, an aryloxy group or a substituted aryloxy group; and $R_8$ and $R_9$ may be linked to each other to form one alkylene group, may be added as a reaction stopper to deactivate the catalyst.

Examples of the trivalent organic phosphorus compound include ethyl tetramethylene phosphine, n-butyl dimethyl phosphine, triethyl phosphine, ethyl pentamethylene phosphine, dimethyl phenyl phosphine, methyl ethyl n-pentyl phosphine, diethyl butyl phosphine, tri-n-butyl phosphine, methyl diphenyl phosphine, ethyl n-pentyl phenyl phosphine, methyl benzyl phenyl phosphine, ethyl diphenyl phosphine, ethyl n-hexyl phenyl phosphine, benzyl n-butyl n-propyl phosphine, ethyl dicyclohexyl phosphine, isopropyl diphenyl phosphine, ethyl benzyl phenyl phosphine, dibenzyl ethyl phosphine, n-butyl diphenyl phosphine, n-propyl benzyl phenyl phosphine, n-butyl benzyl phenyl phosphine, triphenyl phosphine, cyclohexyl diphenyl phosphine, dibenzyl n-butyl phosphine, dicyclohexyl phenyl phosphine, tricyclohexyl phosphine, diphenyl benzyl phosphine, dibenzyl phenyl phosphine, tribenzyl phosphine, ethyl dipropylphosphinite, ethyl butylethylphosphinite, ethyl methylphenylphosphinite, ethyl ethylphenylphosphinite, ethyl dibutylphosphinite, methyl diphenylphosphinite, ethyl diphenylphosphinite, phenyl diphenylphosphinite, phenyl dibenzylphosphinite, dimethyl ethylphosphinite, diethyl ethylphosphinite, diphenyl ethylphosphinite, diethyl propylphosphinite, diethyl butylphosphinite, diethyl phenylphosphinite, dimethyl phenylphosphinite, diethyl benzylphosphinite, trimethyl phosphite, triethyl phosphite, tri-n-propyl phosphite, tri-isopropyl phosphite, tri-n-butyl phosphite, triphenyl phosphite, tricyclohexyl phosphite, tribenzyl phosphite, tritolyl phosphite, β-naphthyl phosphite, tridecyl phosphite, tri-nonylphenyl phosphite and tristearyl trithiophosphite. Triphenyl phosphine, triphenyl phosphite and tritolyl phosphite are especially preferred.

When the treatment using the aforesaid stopper is carried out, not only is the polymerization catalyst deactivated to stop the polymerization reaction, but also the remainder of the deactivated catalyst in the copolymer does not at all adversely affect the heat stability of the copolymer, and therefore, no subsequent washing operation is necessary. In this regard, this treatment provides a simplified process for producing an oxymethylene copolymer.

In addition, the ternary stabilizer system used in this invention acts especially effectively on those oxymethylene copolymers which are obtained after the aforesaid treatment with the organic phosphorus compounds. Accordingly, there is provided a low-priced highly stable oxymethylene copolymer composition.

The following Examples and Comparative Examples illustrate the present invention more specifically. In the following examples, the intrinsic viscosities are measured at 60° C. in p-chlorophenol containing 2% by weight of α-pinene. The unit "phr" of the amount of stabilizers, etc. added denotes parts per 100 parts by weight of the oxymethylene copolymer. All parts and percentages in these examples are by weight unless otherwise specified.

EXAMPLE 1

Trioxane (100 parts) and 2.5 parts of ethylene oxide were polymerized using boron fluoride-diethyl etherate as a catalyst to obtain a crude oxymethylene copolymer. The crude copolymer was divided into two portions. One portion was suspended in an aqueous solution containing tri-n-butylamine, and the suspension was heated to remove the catalyst. The residue was washed and dried to obtain purified oxymethylene copolymer having an intrinsic viscosity of 1.45 dl/g.

The purified oxymethylene copolymer was mixed homogeneously in a Henschel mixer with 0.2 phr of melamine, 0.5 phr of 1,6-hexanediol-bis-3(3,5-di-t-butyl-4-hydroxyphenyl)propionate (Irganox 259'', a trademark of Ciba-Geigy Co.) and 0.1 phr of magnesium hydroxide. Using a vent-equipped twin-screw extruder having an L/D ratio of 27 and a screw diameter of 32 mm, the resulting mixture was heated with a residence time of about 15 minutes, molten, stabilized and extruded through a die head as a white resin strand. The strand was immediately pelletized to form a product.

The resulting stabilized oxymethylene copolymer was tested, and the results are shown in Table 3, (1), (2) and (3).

EXAMPLE 2

To the other portion of the crude oxymethylene copolymer obtained in Example 1 was added triphenyl phosphine in an amount corresponding to 2 molar times the amount of the catalyst, thereby to deactivate the catalyst. Without the operation of removing the catalyst, the same stabilizers in the same proportions as in Example 1 were added to the copolymer, and treated by the same operation as in Example 1 to obtain pellets.

The resulting composition was tested, and the results are shown in Table 3, (1) to (3).

EXAMPLES 3 TO 13

The stabilizers A, B and C and optionally other additives were added as shown in Table 1 to the oxymethylene copolymer obtained in Example 2 by deactivation of the catalyst with triphenyl phosphine. Without the operation of removing the catalyst, they were mixed, and made into pellets in the same way as in Example 1.

The resulting composition was tested, and the results are shown in Table 3, (1) and (2).

Comparative Example 1

In the procedure of Example 1, magnesium hydroxide was not added, but 0.25 phr of melamine and 0.55 phr of Irganox 259 were added to the oxymethylene copolymer, wherein the total amount of the additives was the same.

The resulting composition was tested, and the results are shown in Table 4, (1) and (2).

Comparative Examples 2 to 4

In the procedure of Example 2, one of the three additives was not used, but the total amount of the additives was maintained the same and the stabilizers were added as shown in Table 2.

Comparative Examples 5 and 6

To the oxymethylene copolymer obtained in Example 2 by deactivation of the catalyst with triphenyl phosphine were added the additive A (instead of stabilizer A), the stabilizer B and the stabilizer C as shown in Table 2. The composition was pelletized in the same way as in Example 2.

The test results are shown in Table 4, (1) and (2).

TABLE 1

| | Additive (unit: phr) | | | |
|---|---|---|---|---|
| Example | Stabilizer A | Stabilizer B | Stabilizer C | Other |
| 3 | Melamine 0.2 | Irganox 259 (*1) 0.5 | Ca(OH)$_2$ 0.1 | 0 |
| 4 | Melamine 0.03 | Irganox 0.5 | Mg(OH)$_2$ 0.1 | 0 |
| 5 | Melamine 4.0 | Irganox 0.1 | Mg(OH)$_2$ 0.02 | 0 |
| 6 | Melamine 0.1 | Irganox 1010 (*2) 2.0 | Mg(OH)$_2$ 0.1 | 0 |
| 7 | Melamine 0.2 | Antage W-400 (*3) 0.5 | Mg(OH)$_2$ 2.0 | 0 |
| 8 | Melamine 0.2 | Irganox 259 0.5 | KOH 0.1 | 0 |
| 9 | Melamine 0.2 | Irganox 0.5 | Mg(OH)$_2$ 0.1 | Arcon P-115 (*4) 0.2 |
| 10 | Guanamine 0.3 | Irganox 0.5 | Mg(OH)$_2$ 0.3 | 0 |
| 11 | Benzoguanamine 0.3 | Irganox 0.5 | Mg (OH)$_2$ 0.3 | 0 |
| 12 | 2,4-Diamino-6-methyl-sym-triazine 0.3 | Irganox 0.5 | Mg(OH)$_2$ 0.3 | 0 |
| 13 | Melamine 0.3 | Irganox 0.5 | MgCO$_3$ 0.5 | 0 |

Note:
(*1) Irganox 259 (a trademark of Ciba-Geigy Co., the compound described in Example 1).
(*2) Irganox 1010 (a trademark of Ciba-Geigy Co. for pentaerythrityl-tetrakis [$\beta$-(3,5-di-t-butyl-4-hydroxyphenyl)propionate]).
(*3) Antage W-400 (a trademark of Kawaguchi Chemical Co., Ltd. for 2,2'-methylenebis-(4-methyl-6-t-butylphenol).
(*4) Acron P-115 (a trademark of Arakawa Chemical Co., Ltd. for alicyclic petroleum resins).

EXAMPLE 14

A crude oxymethylene copolymer was produced in the same way as in Example 1 except that 3.5 parts of 1,3-dioxepane was used instead of 2.5 parts of ethylene oxide. Triphenyl phosphine in an amount corresponding to 2 molar times the amount of the catalyst used was added to the crude copolymer to obtain the oxymethylene copolymer having an intrinsic viscosity of 1.43 dl/g. Without the operation of removing the catalyst, the same stabilizers in the same proportions as in Example 1 were added, and the mixture was treated in the same way as in Example 1 to form pellets.

The test results are shown in Table 4, (1) and (2).

Comparative Example 7

Example 3 was repeated except that cyanoguanidine was used instead of melamine as stabilizer A.

The pellets obtained were tested, and the test results are shown in Table 4, (1) and (2).

Comparative Example 8

In the procedure of Example 14, magnesium hydroxide was not used, but 0.25 phr of melamine and 0.55 phr of Irganox 259 were added to the oxymethylene copolymer, wherein the total amount of the additives was the same.

The resulting composition was tested, and the results are shown in Table 4, (1) and (2).

TABLE 2

| | Additive (phr) | | | | | |
|---|---|---|---|---|---|---|
| | Stabilizer A | | Stabilizer B | | Stabilizer C | Additive A |
| Comparative Example | 2 | Melamine 0.25 | Irganox 259 0.55 | | | 0 |
| | 3 | 0 | Irganox 259 0.6 | | Mg(OH)₂ 0.2 | |
| | 4 | Melamine 0.45 | 0 | | Mg(OH)₂ 0.35 | |
| | 5 | | Antage W-400 0.5 | | NaOH 0.015 | 1,4-butanediol-bis-(phenylurethane) 0.5 |
| | | | | | | Malonamide 0.2 |
| | 6 | | Irganox 1098 (*1) 0.5 | | Ca(OH)₂ 0.5 | Urea 0.5 |
| | 7 | | Irganox 259 0.55 | | Ca(OH)₂ 0.1 | Cyanoguanidine 0.2 |

(*1): Irganox 1098, a trademark of Ciba-Geigy for N,N'-hexamethylenebis(3,5-di-t-butyl-4-hydroxycinnamide).

TABLE 3-(1)

| | | | Test Item | | | | |
|---|---|---|---|---|---|---|---|
| | | | Heat stability during molding (*1) | | | | |
| | | | Changes in the appearance of molded article after residence | | | | |
| | Residence test in molding machine (*2) | | Changes in the color of the molded article (*3) | | | | Amount of silver streaks formed (*4) |
| | | | 235° C., 60 min. | | 250° C., 60 min. | | 235° C. / 250° C. |
| Example | After 60 minutes at 235° C. | after 60 minutes at 250° C. | b-Value (yellowing) | w-Value (whiteness) | b-Value (yellowing) | w-Value (whiteness) | After 60 min. / After 60 min. |
| 1 | ◎ | ◎ | 0 | 0 | 1 | 0 | 0 / 0 |
| 2 | ◎ | ◎ | 0 | 0 | 1 | 0 | 0 / 0 |
| 3 | ◎ | ◎ | 0 | 1 | 1 | 0 | 0 / 0 |
| 4 | ◎ | ◎ | 0 | 0 | 1 | 1 | 0 / 1 |
| 5 | ◎ | ◎ | 0 | 0 | 1 | 0 | 0 / 1 |
| 6 | ◎ | ◎ | 0 | 0 | 1 | 0 | 0 / 0 |
| 7 | ◎ | ◎ | 0 | 0 | 1 | 0 | 0 / 1 |
| 8 | ◎ | ◎ | 0 | 0 | 1 | 0 | 0 / 1 |
| 9 | ◎ | ◎ | 0 | 0 | 1 | 0 | 0 / 0 |
| 10 | ◎ | ◎ | 1 | 0 | 2 | 1 | 0 / 1 |
| 11 | ◎ | ◎ | 1 | 0 | 2 | 1 | 0 / 1 |
| 12 | ◎ | ◎ | 1 | 0 | 2 | 1 | 0 / 1 |
| 13 | ◎ | ◎ | 2 | 0 | 2 | 1 | 0 / 1 |
| 14 | ◎ | ◎ | 0 | 0 | 1 | 0 | 0 / 0 |

TABLE 3-(2)

| | Test item | | | | | |
|---|---|---|---|---|---|---|
| | Continuous molding test (1 hr.) (*6) | | | | Long-term hot air environment test (after 500 hrs. at 120° C.) | |
| | Ratio of acceptable products (%) | | Amount of mold deposit (*7) | | Retention of tensile strength (%) | Retention of tensile impact strength (%) |
| Example | 220° C. | 230° C. | 220° C. | 230° C. | | |
| 1 | 92 | 86 | 0 | 0 | 100 | 100 |
| 2 | 93 | 85 | 0 | 0 | 100 | 100 |
| 3 | 85 | 70 | 0 | 0 | 100 | 99 |
| 4 | 85 | 70 | 0 | 0 | 100 | 98 |
| 5 | 85 | 75 | 0 | 0 | 100 | 100 |
| 6 | 90 | 75 | 0 | 0 | 100 | 100 |
| 7 | 85 | 75 | 0 | 0 | 100 | 100 |
| 8 | 83 | 70 | 0 | 0 | 100 | 95 |
| 9 | 95 | 87 | 0 | 0 | 100 | 100 |
| 10 | 85 | 70 | 0 | 0 | 100 | 95 |
| 11 | 85 | 73 | 0 | 0 | 100 | 93 |
| 12 | 84 | 72 | 0 | 0 | 100 | 95 |
| 13 | 82 | 70 | 0 | 0 | 100 | 91 |
| 14 | 94 | 83 | 0 | 0 | 100 | 100 |

TABLE 3-(3)

| Example | Tensile strength Kg/cm² | Tensile elongation % | Flexural strength Kg/cm² | Tensile impact strength Kg.cm/cm² | Izod impact strength (⅛ inch, notched) Kg.cm/cm | Heat distortion temperature 264 psi °C. | Dielectric constant 23° C., 10⁶ Hz |
|---|---|---|---|---|---|---|---|
| 1 | 625 | 60 | 900 | 100 | 6.5 | 110 | 3.7 |
| 2 | 630 | 60 | 900 | 105 | 6.7 | 110 | 3.7 |
| Commercial good (*) | 620 | 60 | 900 | 100 | 6.5 | 110 | 3.7 |

*The product sold by Polyplastics Co., Ltd.
Trade name "Duracon M-9002"
Intrinsic viscosity [η] 1.44 dl/g

TABLE 4-(1)

Test item — Heat stability during molding — Changes in the appearance of the molded article after residence

| Comparative Example | Residence test in molding machine After 60 min. at 235° C. | After 60 min. at 250° C. | Changes in the color of molded article 235° C. b-Value (yellowing) | 235° C. w-Value (whiteness) | 250° C. b-Value (yellowing) | 250° C. w-Value (whiteness) | Amount of silver streaks 235° C. After 60 min. | 250° C. After 60 min. |
|---|---|---|---|---|---|---|---|---|
| 1 | ⊚ | X | 4 | 2 | XX | XX | 4 | XX (*5) |
| 2 | ⊚ | X | 4 | 2 | XX | XX | 5 | XX |
| 3 | X | X | XX (*5) | XX | XX | XX | XX | XX |
| 4 | X | X | XX | XX | XX | XX | XX | XX |
| 5 | ⊚ | X | 10 | 6 | XX | XX | 7 | XX |
| 6 | ⊚ | X | 9 | 8 | XX | XX | 7 | XX |
| 7 | ⊚ | X | 11 | 5 | XX | XX | 10 | XX |
| 8 | ⊚ | X | 4 | 5 | XX | XX | 5 | XX |

TABLE 4-(2)

| Comparative Example | Continuous molding test (1 hr.) (*6) Ratio of acceptable products (%) 220° C. | 230° C. | Amount of mold deposit (*7) 220° C. | 230° C. | Long-term hot air environment test (after 500 hrs. at 120° C.) Retention of tensile strength (%) | Retention of tensile impact strength (%) |
|---|---|---|---|---|---|---|
| 1 | 40 | 20 | 3 | 4 | 95 | 77 |
| 2 | 25 | 3 | 3 | 4 | 95 | 75 |
| 3 | 0 | 0 | 5 | 7 | 40 | 10 |
| 4 | 5 | 0 | 5 | 7 | 45 | 15 |
| 5 | 10 | 2 | 4 | 5 | 85 | 70 |
| 6 | 15 | 3 | 4 | 5 | 83 | 70 |
| 7 | 5 | 0 | 5 | 6 | 95 | 75 |
| 8 | 15 | 5 | 3 | 4 | 90 | 70 |

Notes to Tables 3 and 4
(*1) Heat stability test during molding
Injection molding machine used: MEIKI SJ-35B
Testing method: A sample composition was customarily molded (cyclo time 50 seconds) at a material temperature of 235° C. or 250° C. to form a molded article (to be referred to as an initial-stage article). Then, after a residence time of 60 minutes in the cylinder, it was injection molded to form a molded article (to be referred to as an after-residence article). The degrees of changes in the appearance of the initial-stage articles and the after-residence article were tested by their color, the amount of silver streaks formed, etc.
(*2) Residence test in a molding machine
⊚: This mark indicates that after residence for 60 minutes at the indicated temperature, the composition is moldable.
X: This mark indicates that after residence for 60 minutes at the indicated temperature, the injection operation of the molding machine does not cause the composition to flow into the mold because the composition has been decomposed and foamed, and therefore, the composition cannot be molded.
(*3) Change in color
Instrument used: Hunter color difference meter (a product of Nippon Denshoku Kogyo Co., Ltd.)
Change in b value: The difference between the b value of the molded product obtained after residence for 60 minutes and that of the initial stage-molded article.

| Change in b value | Observation with the naked eye |
|---|---|
| 0-2 | No change in color is noted. |
| 3-5 | Some yellowing is noted. |
| 6-7 | Somewhat strong yellowing is noted. |

TABLE 4-(2)-continued

| 8-9 | Strong yellowing is clearly noted. |
|---|---|
| 10 or more | Change to light brown is noted. |

Change in w value: The difference between the w value of the molded product obtained after residence for 60 minutes and that of the initial-stage molded product.

| Change in w value | Observation with the naked eye |
|---|---|
| 0-3 | No change in color is noted. |
| 3-5 | Great change in color is noted. |
| 6 or more | Drastic change in color is noted. |

(*4) Amount of silver streaks formed

| Numerical value | Degree of occurrence of silver streaks |
|---|---|
| 0 | No silver streaks is noted on the surface of the molded article. |
| 1 | Very slight silver streaks are noted on the surface of the molded article. |
| 2-3 | Silver streaks are partly noted on the surface of the molded article. |
| 4-5 | Considerable silver streaks are noted on the surface of the molded article. |
| 6-7 | Silver streaks are noted on the nearly entire surface of the molded article. |
| 8 or more | The surface of the molded article is extremely poor because of the |

TABLE 4-(2)-continued decomposition of the resin.

(*5) XX marks in the column relating to the changes in the appearance of the molded article:
XX: Because molding is impossible at the indicated temperature of material, no molded article can be collected. Hence, its color cannot be measured, and the degree of occurrence of silver streaks cannot be observed.
(*6) Continuous molding test
Injection molding machine used: MEIKI SJ-35B
Testing method: At a material temperature of 220° C. or 230° C., the composition is continuously molded for about 1 hour to form a test piece in a disc shape, 3.2 mm thick × 100 mm in diameter, and then the appearance of the disc specimen was observed with the naked eye. The molded articles were assorted according to the formation of silver streaks, flashes, flow marks, etc., and the percentage of acceptable articles was calculated.
(*7) Amount of molded deposit
After continuous molding for about 1 hour, the surface of the mold was observed with the naked eye.

| Numerical value | Degree of occurrence of mold deposit |
|---|---|
| 0 | No mold deposit forms. |
| 1 | Very slight mold deposit is noted. |
| 2–3 | A thin layer of mold deposit is noted on the surface. |
| 4–5 | Mold deposit is formed in a slightly thicker layer. |
| 6–7 | Mold deposit is formed in a thick layer on the entire surface of the mold. |

What we claim is:

1. A stabilized oxymethylene copolymer composition comprising an oxymethylene copolymer, and incorporated therein a stabilizer system consisting essentially of:
   (1) 0.01 to 7 parts by weight, based on 100 parts by weight of the oxymethylene copolymer, of at least one aminesubstituted triazine of the following formula

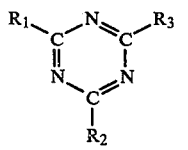 (A)

wherein $R_1$, $R_2$ and $R_3$ represent a hydrogen atom, a halogen atom, a hydroxyl group, an alkyl group, an alkoxy group, an aryl group, a hydrogenated aryl group, an amino group or a hydroxymethylated amino group, and at least one of them is an amino group or a hydroxymethylated amino group,
   (2) 0.05 to 5 parts by weight, based on 100 parts by weight of the oxymethylene copolymer, of at least one sterically hindered phenol (B) selected from the group consisting of 2,2'-methylenebis (4-methyl-6-t-butylphenol), distearyl-3,5-di-t-butyl-4-hydroxybenzyl phosphonate, 2,6,7-trioxa-1-phosphabicyclo[2.2.2]-oxy-4-yl-methyl-3,5-di-t-butyl-4-hydroxy-hydrocinnamate, 1-(3,5-di-t-butyl-4-hydroxyphenyl)-3,5-distearyl-thiotriazylamine, 2(2'-hydroxy-3',5'-di-t-butylphenyl)-5-chlorobenzotriazole, 2,6-di-t-butyl-4-methylphenol, 1,3,5-trimethyl-2,4,6-tris (3,5-di-t-butyl-4-hydroxybenzyl) benzene, 4,4'-methylene-bis (2,6-di-t-butylphenol), 3,5-di-t-butyl-4-hydroxybenzyl-dimethylamine and N,N'-hexamethylenebis(3,5-di-t-butyl-4-hydroxy-hydrocinnamide), and
   (3) 0.004 to 5 parts by weight, based on 100 parts by weight of the oxymethylene copolymer, of at least one metal-containing compound (C) selected from the group consisting of hydroxides of an alkali metal which is sodium or potassium or an alkaline earth metal which is magnesium, calcium or barium.

2. The composition of claim 1 wherein said amine-substituted triazine (A) is melamine, hydroxymethylated melamine, guanamine, benzoguanamine, or 2,4-diamino-6-methyl-sym-triazine.

3. The composition of claim 1 wherein said sterically hindered phenol (B) is 2,2'-methylenebis (4-methyl-6-t-butylphenol) or N,N'-hexamethylenebis (3,5-di-t-butyl-4-hydroxy-hydrocinnamide).

4. The composition of claim 1 wherein said metal-containing compound (C) is potassium hydroxide, calcium hydroxide, or magnesium hydroxide.

5. The composition of claim 1 wherein said oxymethylene copolymer is a polymer obtained by copolymerizing formaldehyde and/or its cyclic oligomer with another cyclic ether and/or a cyclic acetal in the presence of a polymerization catalyst, optionally followed by stabilizing the terminal groups of the polymer.

6. The composition of claim 1 wherein said oxymethylene copolymer is a polymer obtained by copolymerizing formaldehyde and/or its cyclic oligomer with another cyclic ether and/or a cyclic acetal in the presence of a polymerization catalyst, and then adding a trivalent organic phosphorus compound of the formula

 (D)

wherein $R_7$, $R_8$ and $R_9$ are identical or different, and each represents an alkyl group, a cycloalkyl group, a haloalkyl group, an aryl group, an alkyl-substituted aryl group, or an aralkyl group, and $R_8$ and $R_9$ may be linked to each other to form one alkylene group, as a termination agent to terminate the polymerization reaction.

* * * * *